(12) United States Patent
Kawaura et al.

(10) Patent No.: US 8,002,163 B2
(45) Date of Patent: Aug. 23, 2011

(54) FRICTION WELDING APPARATUS

(75) Inventors: Koichi Kawaura, Kariya (JP); Hideaki Yamaguchi, Ohbu (JP)

(73) Assignees: Kabushiki Kaisha Toyota Jidoshokki, Aichi-ken (JP); Izumi Machine Mfg. Co., Ltd., Aichi-ken (JP)

( * ) Notice: Subject to any disclaimer, the term of this patent is extended or adjusted under 35 U.S.C. 154(b) by 0 days.

(21) Appl. No.: 12/362,854

(22) Filed: Jan. 30, 2009

(65) Prior Publication Data

US 2009/0200356 A1 Aug. 13, 2009

(30) Foreign Application Priority Data

Feb. 7, 2008 (JP) ................ P2008-027367

(51) Int. Cl.
*B23K 20/12* (2006.01)
*B23K 37/00* (2006.01)

(52) U.S. Cl. .......... 228/2.3; 228/2.1; 228/112.1

(58) Field of Classification Search .......... 228/2.3, 228/2.1, 112.1
See application file for complete search history.

(56) References Cited

U.S. PATENT DOCUMENTS

| 3,234,644 A | * | 2/1966 | Hollander | 228/113 |
| 4,733,814 A | * | 3/1988 | Penman | 228/2.3 |
| 6,170,731 B1 | * | 1/2001 | Hofius et al. | 228/2.1 |

FOREIGN PATENT DOCUMENTS

| JP | 56-102390 A | | 8/1981 |
| JP | 2000042761 A | * | 2/2000 |
| JP | 2001-113379 A | | 4/2001 |
| JP | 2001113379 A | * | 4/2001 |

* cited by examiner

*Primary Examiner* — Jessica L Ward
*Assistant Examiner* — Devang R Patel
(74) *Attorney, Agent, or Firm* — Locke Lord Bissell & Liddell LLP

(57) ABSTRACT

A friction welding apparatus includes a first holder for holding a first work piece, a second holder for holding a second work piece, a thrust mechanism and a shaft. The thrust mechanism moves the second holder toward or away from the first holder. The shaft is connected to the first holder and the second holder for receiving thrust caused by the thrust mechanism. The shaft has a tie rod and an externally threaded member which is coaxially connected to the tie rod so that the externally threaded member is rotatable on an axis thereof. The thrust mechanism has the externally threaded member, an internally threaded member and a thrust motor. The internally threaded member is provided in either one of the first holder and the second holder and engaged with the externally threaded member. The thrust motor rotates the externally threaded member relative to the internally threaded member.

7 Claims, 5 Drawing Sheets

# FRICTION WELDING APPARATUS

BACKGROUND OF THE INVENTION

The present invention relates to a friction welding apparatus for friction welding a pair of work pieces together by pressing one of the work pieces against the other while rotating the work pieces relatively.

Various types of friction welding apparatuses are known, one of which is disclosed by Japanese Patent Application Publication No. 2001-113379. The friction welding apparatus of this first publication includes a first holder for holding a first work piece, a second holder for holding a second work piece and a spindle motor for rotating the first work piece on its axis. A pair of hydraulic cylinders or a pair of ball screws is provided for moving the second holder toward the first holder. Another friction welding apparatus is disclosed by Japanese Patent Application Publication No. 56-102390. The friction welding apparatus of this second publication includes a frame, a spindle stock mounted slidably to the frame and holding a first work piece, and a spindle motor for rotating the first work piece on its axis. The frame has an externally threaded member inserted in the spindle stock, an internally threaded member engaged with the externally threaded member, and a thrust motor for rotating the internally threaded member. When the internally threaded member is rotated, the first work piece is moved by the spindle stock toward a second work piece and then in pressing contact with the second work piece for friction welding the work pieces together.

Though the first publication discloses the use of hydraulic cylinders in the friction welding apparatus, it fails to disclose an apparatus using any specific ball screw. In addition, the second publication discloses a structure for sliding the spindle stock by rotating the internally threaded member, but it is of a portable type. For application of the structure of this portable friction welding apparatus to a stationary type friction welding apparatus, it is necessary to provide any additional means for rotatably holding the internally threaded member at its outer periphery. However, the provision of such additional holder will inevitably result in an increased size of the apparatus. Therefore, the present invention is directed to a friction welding apparatus which can be made compact and has a reasonable structure.

SUMMARY OF THE INVENTION

In accordance with one aspect of the present invention, there is provided a friction welding apparatus for friction welding a first work piece and a second work piece together by pressing the second work piece against the first work piece while rotating one of the work pieces relative to the other work piece. The friction welding apparatus includes a first holder, a second holder, a thrust mechanism and a shaft. The first holder is operable to hold the first work piece. The second holder is operable to hold the second work piece. The thrust mechanism is operable to move the second holder toward or away from the first holder. The shaft is connected to the first holder and the second holder for receiving thrust caused by the thrust mechanism. The shaft has a tie rod and an externally threaded member which is coaxially connected to the tie rod so that the externally threaded member is rotatable on an axis thereof. The thrust mechanism has the externally threaded member, an internally threaded member and a thrust motor. The internally threaded member is provided in either one of the first holder and the second holder and engaged with the externally threaded member. The thrust motor rotates the externally threaded member relative to the internally threaded member.

In accordance with another aspect of the present invention, there is provided a friction welding apparatus for double-head friction welding a first work piece, a second work piece and a third work piece together by pressing the second work piece against the first work piece during a relative rotation of the second work piece and the first work piece while pressing the third work piece against the first work piece during a relative rotation of the third work piece and the first work piece. The friction welding apparatus includes a first holder, a second holder, a first thrust mechanism, a third holder, a second thrust mechanism and a shaft. The first holder is operable to hold the first work piece. The second holder is operable to hold the second work piece. The first thrust mechanism is operable to move the second holder toward or away from the first holder. The third holder is operable to hold the third work piece, The second thrust mechanism is operable to move the third holder toward or away from the first holder. The shaft is connected to all of the first holder, the second holder and the third holder for receiving thrust caused by the first thrust mechanism and the second thrust mechanism. The shaft has in the middle thereof a tie rod, a first externally threaded member and a second externally threaded member. The first and second externally threaded members are coaxially connected to the tie rod at the opposite ends thereof so that the first and second externally threaded members are rotatable on an axis thereof. The first thrust mechanism has the first externally threaded member, a first internally threaded member and a first thrust motor. The first internally threaded member is provided in the second holder and engaged with the first externally threaded member. The first thrust motor rotates the first externally threaded member relative to the first internally threaded member. The second thrust mechanism has the second externally threaded member, a second internally threaded member and a second thrust motor. The second internally threaded member is provided in the third holder and engaged with the second externally threaded member. The second thrust motor rotates the second externally threaded member relative to the second internally threaded member.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
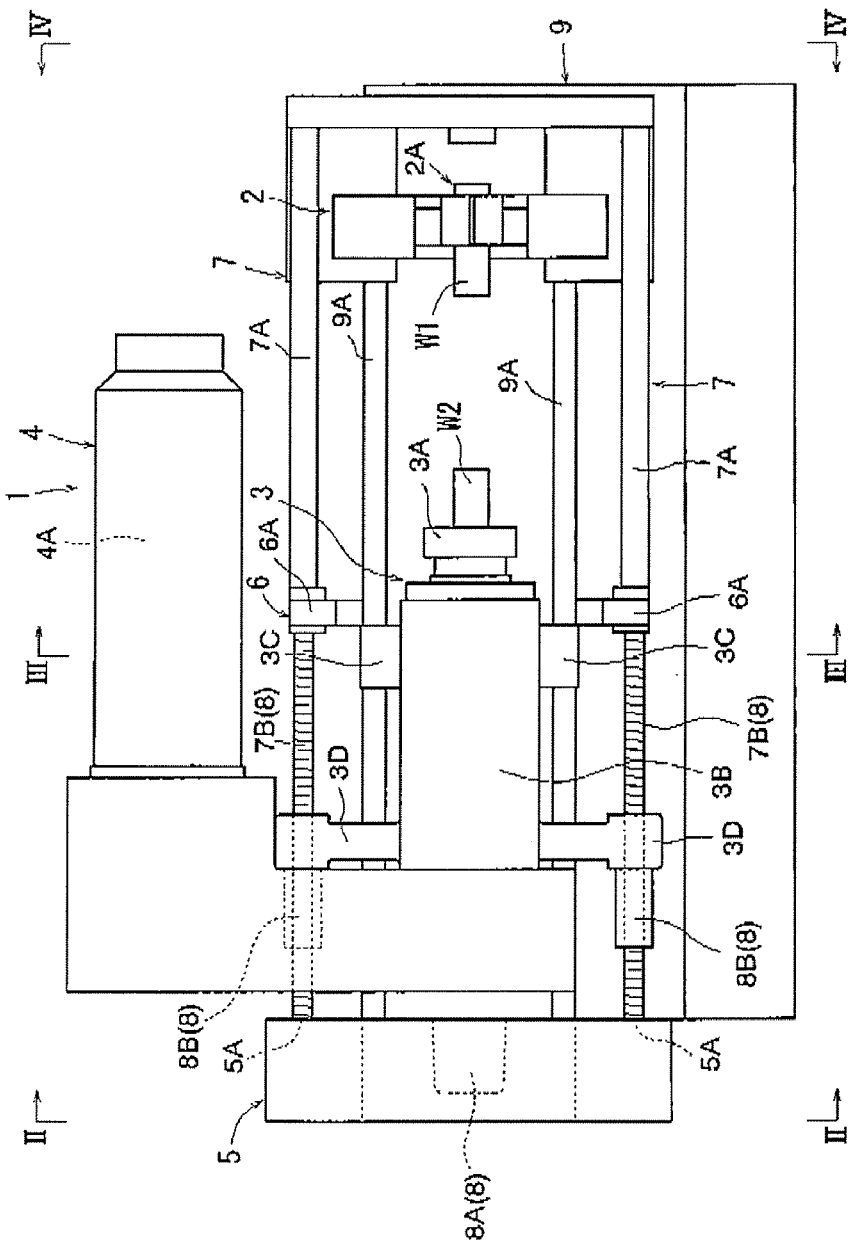
FIG. 1 is a front view showing a friction welding apparatus according to a first embodiment of the present invention.

The following will describe the friction welding apparatus according to the first embodiment of the present invention with reference to FIGS. 1 through 5. Referring to FIG. 1, the friction welding apparatus 1 includes a bed 9, a first stationary holder 2 mounted immovably on the bed 9 at the right end thereof, a stationary motor support 5 mounted immovably on the bed 9 at the left end thereof, and a second holder 3 (or spindle unit) mounted slidably relative to the bed 9. The bed 9, the first holder 2 and the motor support 5 cooperate to form a body of the apparatus 1. The first holder 2 has a clamp 2A for holding a first work piece W1 (refer to FIG. 4).

Figure 3:
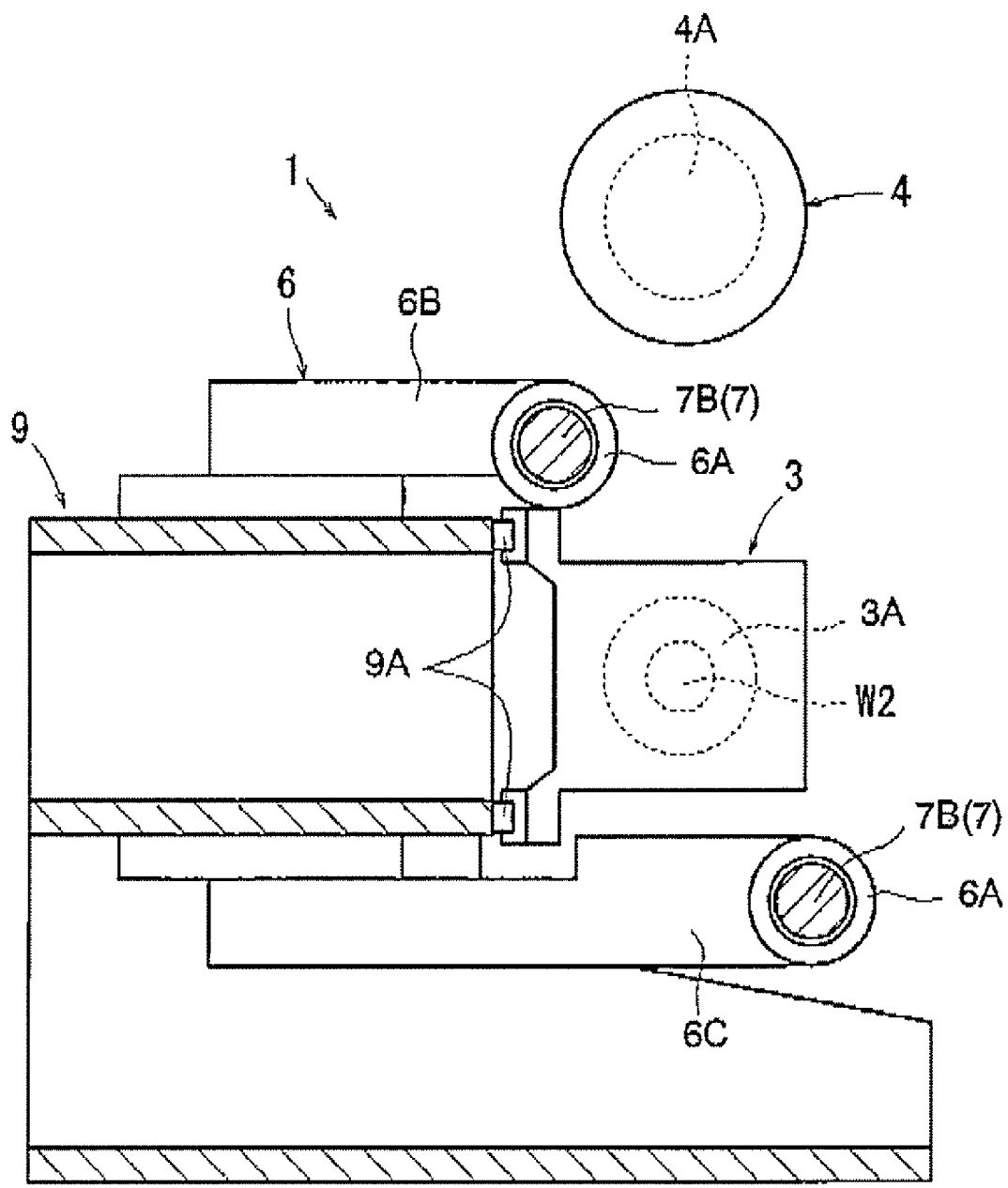
FIG. 3 is a cross sectional view of the friction welding apparatus as taken along the line III-III of FIG. 1.

As shown in FIGS. 1 and 3, the second holder 3 has at the right end thereof a chuck 3A for holding a second work piece W2 and at the right end thereof a spindle stock 4 having therein a spindle motor 4A. A power transmission mechanism (not shown) is provided between the spindle stock 4 and the second holder 3 for transmitting power of the spindle motor 4A to the chuck 3A thereby to rotate the second work piece W2 on the chuck 3A. The second holder 3 has upper and lower guides 3C mounted slidably on upper and lower rails 9A mounted to the bed 9, respectively.

Figure 2:
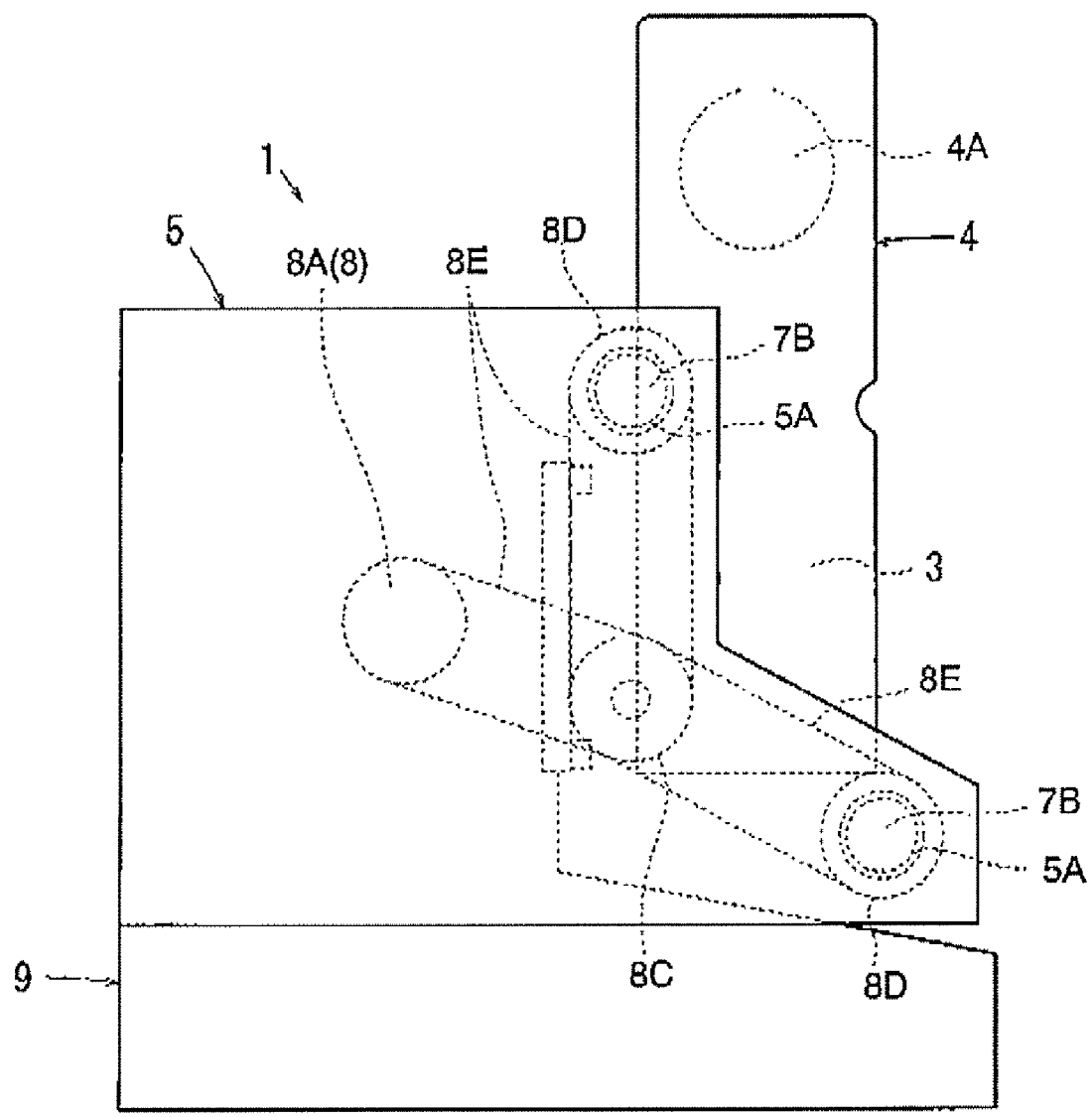
FIG. 2 is a side view of the friction welding apparatus as viewed along the line II-II of FIG. 1.

As shown in FIGS. 1 and 2, a thrust mechanism 8 is provided between the motor support 5 and the second holder 3 for sliding the second holder 3 relative to the bed 9 along the guides 3C. The thrust mechanism 8 has a thrust motor 8A provided in the motor support 5, a pair of upper and lower externally threaded members 7B, and a pair of upper and lower internally threaded members 8B engaged with the respective externally threaded members 7B. The thrust motor 8A has an output shaft which is connected through a timing belt 8E to a pulley 8C provided in the motor support 5. This pulley 8C is connected through a pair of timing belts 8E to a pair of upper and lower pulleys 8D provided in the motor support 5. The paired externally threaded members 7B are respectively fixedly connected to the paired pulleys 8D for rotation therewith. Thus, each externally threaded member 7B is rotated on the axis thereof in accordance with rotation of the output shaft of the thrust motor 8A.

As shown in FIG. 1, each externally threaded member 7B is made in the form of a rod with external thread on the outer periphery thereof. Each externally threaded member 7B is supported at the left end thereof by a bearing unit 5A provided in the motor support 5 so as to be rotatable on the axis thereof but immovable in the axial direction thereof. Each externally threaded member 7B is supported at the opposite right end thereof by a bearing unit 6A provided in the intermediate holder 6 so as to be rotatable on the axis thereof but immovable in the axial direction thereof. The upper and lower externally threaded members 7B are respectively inserted through upper and lower brackets 3D of the second holder 3 and engaged with the internally threaded members 8B mounted to the brackets 3D at the left end thereof. Therefore, when the thrust motor 8A causes each externally threaded member 7B to rotate on the axis thereof, the internally threaded members 8B are moved along the externally threaded members 7B, respectively. Thus, the second holder 3 slides relative to the bed 9 through the internally threaded members 8B.

As shown in FIG. 1, a pair of upper and lower tie rods 7A are connected coaxially to the paired externally threaded members 7B, respectively. Thus, the paired tie rods 7A and the paired externally threaded members 7B cooperate to form a pair of shafts 7. The externally threaded members 7B are part of the thrust mechanism 8 and also part of the shafts 7. Each of the tie rods 7A is made in the form of a rod. Each tie rod 7A is nonrotatably connected at the right end thereof to the first holder 2 and at the opposite left end thereof to the intermediate holder 6. As shown in FIGS. 1 and 3, the intermediate holder 6 is fixedly mounted on the bed 9 at substantially the intermediate position thereof. The intermediate holder 6 has an upper bracket 6B and a lower bracket 6C. The bearing units 6A are provided on the front ends of the brackets 6B, 6C, respectively.

Figure 5:
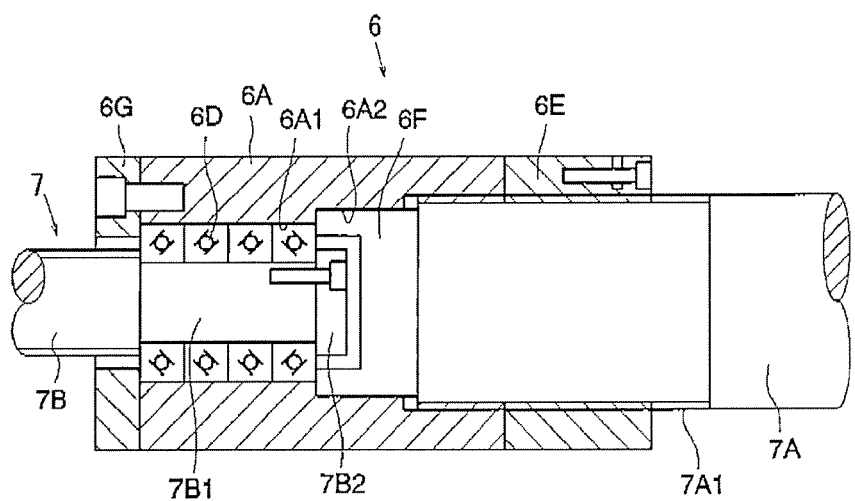
FIG. 5 is a partially cross-sectional fragmentary front view of a tie rod, an externally threaded member and a bearing unit supporting the ends of the tie rod and the externally threaded member.

As shown in FIG. 5, each bearing unit 6A has at the left end thereof a first bore 6A1 and at the right end thereof a second bore 6A2 whose radius curvature is larger than that of the first bore 6A1. The right end portion 7B1 of each externally threaded member 7B is inserted in the first bore 6A1 of the bearing unit 6A. The bearing unit 6A has in the first bore 6A1 thereof a plurality of roller bearings 6D. A retainer 7B2 is mounted at the tip end of the right end portion 7B1 for retaining the roller bearings 6D. The roller bearings 6D of the present embodiment are adapted to receive not only radial load but also tensile load of the shaft 7. The roller bearings 6D are installed in the first bore 6A1 of each bearing unit 6A together with its corresponding right end portion 7B1 of the externally threaded member 7B. A retainer 6G is provided for each bearing unit 6A at the left end thereof for retaining the roller bearings 6D. Thus, each externally threaded member 7B is supported by the roller bearings 6D rotatably but in such a way that its axial movement is prevented.

Figure 4:
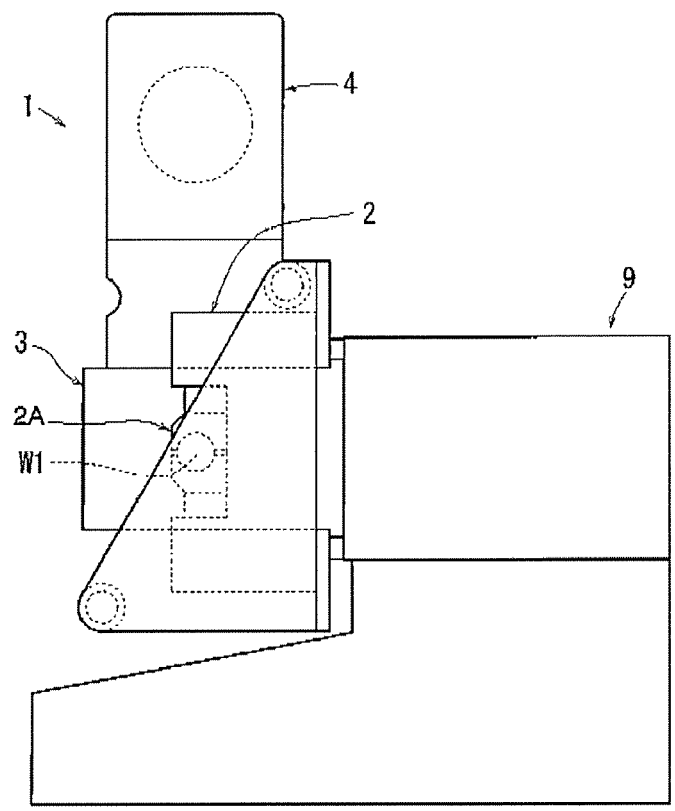
FIG. 4 is a side view of the friction welding apparatus as viewed along the line IV-IV of FIG. 1.

As shown in FIG. 5, a spacer 6F and a part of the left end portion 7A1 of the tie rod 7A are inserted in the second bore 6A2 of each bearing unit 6A. The left end portion 7A1 of each tie rod 7A is formed on the outer periphery thereof with external thread, and a nut 6E is screwed on the left end portion 7A1. The second bore 6A2 of each bearing unit 6A is formed on the inner periphery thereof with internal thread. With each left end portion 7A1 screwed into the corresponding second bore 6A2, its nut 6E is fastened. Thus, each tie rod 7A is secured to its bearing unit 6A so that the tile rod 7A is nonrotatable on its axis. Therefore, each tie rod 7A and its externally threaded member 7B are connected through the intermediate holder 6 so that the externally threaded member 7B is rotatable on its axis. As shown in FIGS. 3 and 4, the paired shafts 7 are located so as to be rotationally symmetric relative to the central axis of the work pieces W1, W2.

In friction welding the first and second word pieces W1 and W2 by the friction welding apparatus 1, the second word piece W2 is rotated on its axis by the spindle motor 4A and each externally threaded member 7B is rotated by the thrust motor 8A thereby to move its corresponding second holder 3 toward the first holder 2 for pressing the second work piece W2 against the first work piece W1. Thus, pressing the second word piece W2 against the first work piece W1, thrust is generated, which is received by the shafts 7. Simultaneously, frictional heat is generated thereby to weld the first work piece W1 and the second word piece W2 together in the manner well known in the art.

As described above, the paired shafts 7 are provided between the first holder 2 and the second holder 3 so as to receive thrust during friction welding the first and second work pieces W1 and W2. Each shaft 7 has the tie rod 7A and the externally threaded member 7B which is coaxially connected to the tie rod 7A so that the externally threaded member 7B is rotatable on the axis thereof.

The shaft 7 having the tie rod 7A and the externally threaded member 7B connected coaxially can be made compact as compared to a case wherein the tie rod and the externally threaded member are juxtaposed separately. In addition, according to the above embodiment, setting of the work pieces W1, W2 and the subsequent removal of welded product can be performed with ease. Because each externally threaded member 7B whose diameter is smaller than that of the internally threaded member 8B is rotated, the friction welding apparatus 1 (or the second holder 3) is made compact as compared to a case wherein the internally threaded member is rotatably held at its outer periphery. The connection of the externally threaded member 7B and its corresponding tie rod 7A reduces the length of the externally threaded member 7B as compared to a case wherein the shaft includes only the externally threaded member. Therefore, deflection of the externally threaded member 7B caused when it is rotated at a high speed is reduced. Thus, the friction welding apparatus 1 can be operated in such a way that the first holder 2 is moved toward or away from the second holder 3 at a relatively high speed.

As shown in FIG. 1, in the friction welding apparatus 1, the right end of each externally threaded member 7B is connected to the left end of its corresponding tie rod 7A so as to be rotatable on the axis of the externally threaded member 7B. The left end of each externally threaded member 7B is supported by the motor support 5 so as to be rotatable on the axis of the externally threaded member 7B but immovable in the axial direction of the externally threaded member 7B. The right end of each tie rod 7A is supported by the first holder 2 so as to be nonrotatable on the axis thereof. Thus, each shaft 7 connecting the externally threaded member 7B and the tie rod 7A is supported at opposite ends thereof, so that it is stably supported by the motor support 5 and the first holder 2.

The friction welding apparatus 1 has the intermediate holder 6 mounted fixedly on the bed 9. Each tie rod 7A and its externally threaded member 7B are connected through the bearing unit 6A of the intermediate holder 6 so that the externally threaded member 7B is rotatable on the axis thereof. Therefore, of the connection between the tie rod 7A and its externally threaded member 7B Is held stably by the intermediate holder 6.

The paired shafts 7 are located rotationally symmetrically with respect to the center of rotation of the second work piece W2. Therefore, thrust generated in pressing the first work piece W1 against the second work piece W2 is received by the paired shafts 7. The term "center of rotation" means the center around which the work piece is rotated during friction welding. When the joint of work pieces welded together has a cylindrical shape, the center of rotation coincides with the central axis of the work pieces. The center of the reaction force to the thrust is generated at the center of rotation of the second work piece W2. The moment of the reaction force and the moment of the thrust applied to the shafts 7 are offset because the paired shafts 7 are located rotationally symmetrically with respect to the center of rotation of the second work piece W2. Consequently, any inclination of the work pieces W1, W2 in pressing the first work piece W1 against the second work piece W2 is reduced, so that the accuracy of pressing position is improved.

Figure 6:
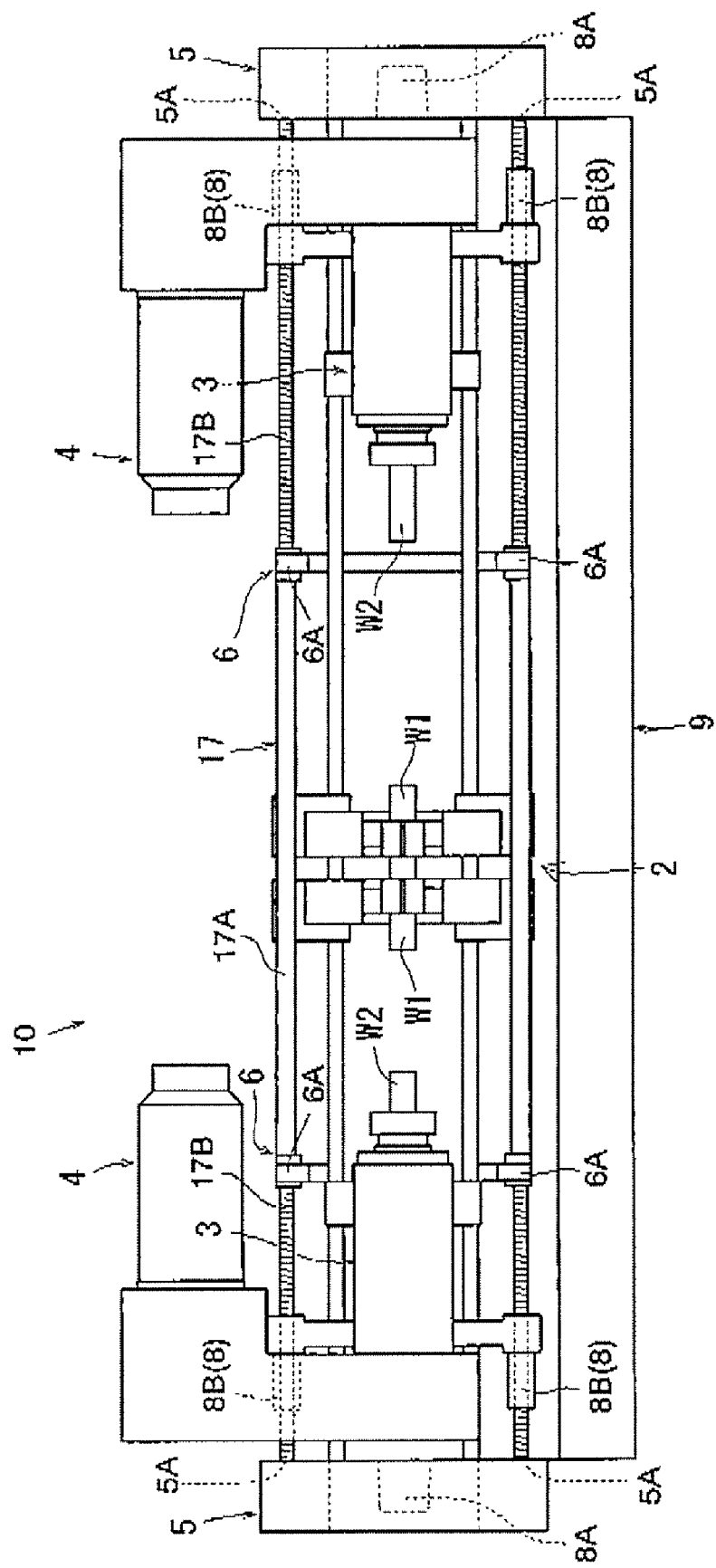
FIG. 6 is a front view showing a friction welding apparatus according to a second embodiment of the present invention.

The following will describe the friction welding apparatus according to the second embodiment of the present invention with reference to FIG. 6. The friction welding apparatus 10 of the second embodiment has substantially the same structure as the friction welding apparatus 1 of the first embodiment except that the friction welding apparatus 10 of the second embodiment is of a double head type while the friction welding apparatus 1 of the first embodiment is of a single head type. The following description will mainly deal with the difference between the first embodiment and the second embodiment.

Referring to FIG. 6, the friction welding apparatus 10 includes a bed 9, a stationary first holder 2 mounted immovably on the bed 9 at the middle thereof, a pair of stationary motor supports 5 mounted immovably on the bed 9 at the opposite ends thereof. Between the left motor support 5 and the first holder 2 are provided a left stationary intermediate holder 6 mounted immovably on the bed 9 and a left second holder 3 mounted slidably on the bed 9. Similarly, between the right motor support 5 and the first holder 2 are provided a right stationary intermediate holder 6 mounted immovably on the bed 9 and a right second holder 3 mounted slidably on the bed 9. Each second holder 3 is provided with a spindle stock 4.

A pair of shafts 17 is provided between the paired motor supports 5. Each shaft 17 has in the middle thereof a tie rod 17A and a pair of externally threaded members 17B connected to the opposite ends of the tie rod 17A. The opposite ends of the tie rod 17A and the inward ends of its corresponding paired externally threaded members 17B are coaxially connected through a pair of intermediate holders 6, so that the externally threaded members 17B are rotatable on the axis thereof. The outward end of each externally threaded member 17B is supported by the bearing unit 5A of the motor support 5 so that the externally threaded member 17B is rotatable on the axis thereof but immovable in the axial direction thereof. Each motor support 5 is provided with a thrust motor 8A for rotating its corresponding paired externally threaded members 17B on the axis thereof.

The present invention is not limited to the above-described two embodiments, but it may be practiced in various manners as exemplified below.

(1) The friction welding apparatus 1 of the first embodiment is formed so that the first holder 2 is mounted immovably relative to the bed 9 and the second holder 3 holding the second work piece W2 rotatably is mounted movably relative to the bed 9. However, this friction welding apparatus may be modified so that the first holder is mounted movably relative to the bed and the second holder holding the second work piece rotatably is mounted immovably relative to the bed.

(2) The shaft 7 of the first embodiment is supported at one end thereof by the motor support 5 so as to be rotatable on its axis. However, the one end of the shaft 7 may be supported by the second holder for the thrust motor.

(3) In the first and second embodiments, the shaft 7 (17) has a tie rod 7A located adjacent to the first holder 2 and an externally threaded member 7B (17B) located adjacent to the second holder 3. However, the shaft may have an externally threaded member located adjacent to the first holder and a tie rod located adjacent to the second holder.

(4) In the first and second embodiments, the externally threaded member 7B (17B) is engaged with its corresponding internally threaded member 8B with no intervention therebetween. However, the externally threaded member may be engaged with the internally threaded member through a ball screw mechanism.

(5) The tie rod 7A (17A) and its corresponding externally threaded member 7B (17B) of the shaft 7 (17) according to the first and second embodiments are connected through the intermediate holder 6 so that the externally threaded member 7B (17B) is rotatable on the axis thereof. However, the tie rod 7A (17A) and the externally threaded member 7B (17B) may be connected through a bearing provided for either one of the externally threaded member 7B (17B) and the be rod 7A (17A) so that the externally threaded member 7B (17B) is rotatable on the axis thereof.

(6) Although the friction welding apparatus 1 (10) of the first and second embodiments has paired (or two) shafts 7 (17), it may have three or more shafts. In this case, it is desirable that each shaft should be arranged so as to receive the thrust uniformly.

Therefore, the present examples and embodiments are to be considered as illustrative and not restrictive, and the invention is not to be limited to the details given herein but may be modified within the scope of the appended claims.

What is claimed is:

1. A friction welding apparatus for friction welding a first work piece and a second work piece together by pressing the second work piece against the first work piece while rotating one of the work pieces relative to the other work piece, comprising:
   a first holder for holding the first work piece;
   a second holder for holding the second work piece;
   a thrust mechanism for moving the second holder toward or away from the first holder;
   a shaft connected to the first holder and the second holder for receiving thrust caused by the thrust mechanism, wherein the shaft has a tie rod and an externally threaded member which is coaxially connected to the tie rod wherein the externally threaded member is rotatable on an axis thereof and the tie rod is nonrotatable on the axis,
   wherein the thrust mechanism has the externally threaded member, an internally threaded member and a thrust motor such that the tie rod and the thrust motor are connected to opposite ends of the externally threaded member, wherein the internally threaded member is provided in either one of the first holder and the second holder and engaged with the externally threaded member, wherein the thrust motor rotates the externally threaded member relative to the internally threaded member,
   wherein one end of the externally threaded member is connected to one end of the tie rod so that the externally threaded member is rotatable on the axis and the other end of the externally threaded member receives power from the thrust motor.

2. The friction welding apparatus according to claim 1, wherein the other end of the externally threaded member is supported by a body of the apparatus so as to be rotatable on the axis and immovable in a direction of the axis, wherein the other end of the tie rod is supported by the body so as to be nonrotatable on the axis.

3. The friction welding apparatus according to claim 1, further comprising an intermediate holder mounted fixedly on a body of the apparatus, wherein the intermediate holder has a bearing unit for connecting the tie rod and the externally threaded member so that the externally threaded member is rotatable on the axis.

4. The friction welding apparatus according to claim 3, wherein the bearing unit has a roller bearing which is retained at one end of the externally threaded member with a retainer mounted on the tip end thereof.

5. The friction welding apparatus according to claim 1, wherein the shaft is provided in a pair, wherein the paired shafts are located rotationally symmetrically with respect to center of rotation of the rotatable work piece.

6. The friction welding apparatus according to claim 5, wherein the thrust motor rotates both the externally threaded members of the paired shafts through a pulley and belt.

7. A friction welding apparatus for double-head friction welding a first work piece, a second work piece and a third work piece together by pressing the second work piece against the first work piece during a relative rotation of the second work piece and the first work piece while pressing the third work piece against the first work piece during a relative rotation of the third work piece and the first work piece, comprising:
   a first holder for holding the first work piece;
   a second holder for holding the second work piece;
   a first thrust mechanism for moving the second holder toward or away from the first holder;
   a third holder for holding the third work piece;
   a second thrust mechanism for moving the third holder toward or away from the first holder;
   a shaft connected to all of the first holder, the second holder and the third holder for receiving thrust caused by the first thrust mechanism and the second thrust mechanism, wherein the shaft has a tie rod, a first externally threaded member and a second externally threaded member, wherein the first and second externally threaded members are coaxially connected to the tie rod at the opposite ends thereof so that the first and second externally threaded members are rotatable on an axis thereof,
   wherein the first thrust mechanism has the first externally threaded member, a first internally threaded member and a first thrust motor, wherein the first internally threaded member is provided in the second holder and engaged with the first externally threaded member, wherein the first thrust motor rotates the first externally threaded member relative to the first internally threaded member,
   wherein the second thrust mechanism has the second externally threaded member, a second internally threaded member and a second thrust motor, wherein the second internally threaded member is provided in the third holder and engaged with the second externally threaded member, wherein the second thrust motor rotates the second externally threaded member relative to the second internally threaded member.

* * * * *